(12) United States Patent
Abboud et al.

(10) Patent No.: US 12,055,459 B2
(45) Date of Patent: Aug. 6, 2024

(54) METHOD FOR MONITORING A TURBOMACHINE, DEVICE, SYSTEM, AIRCRAFT AND COMPUTER PROGRAM PRODUCT

(71) Applicants: SAFRAN, Paris (FR); SAFRAN AIRCRAFT ENGINES, Paris (FR)

(72) Inventors: Dany Abboud, Moissy-Cramayel (FR); Mohammed El Badaoui, Moissy-Cramayel (FR); Nicolas Paul Tableau, Moissy-Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 266 days.

(21) Appl. No.: 17/782,451

(22) PCT Filed: Dec. 4, 2020

(86) PCT No.: PCT/FR2020/052285
§ 371 (c)(1),
(2) Date: Jun. 3, 2022

(87) PCT Pub. No.: WO2021/111093
PCT Pub. Date: Jun. 10, 2021

(65) Prior Publication Data
US 2023/0016039 A1 Jan. 19, 2023

(30) Foreign Application Priority Data
Dec. 4, 2019 (FR) ...................................... 1913699

(51) Int. Cl.
*G01M 15/14* (2006.01)
*F01D 21/00* (2006.01)
(52) U.S. Cl.
CPC ........... *G01M 15/14* (2013.01); *F01D 21/003* (2013.01); *F05D 2260/80* (2013.01)

(58) Field of Classification Search
CPC ... G01M 15/14; F01D 21/003; F05D 2260/80
See application file for complete search history.

(56) References Cited

U.S. PATENT DOCUMENTS

| 5,123,241 A | * | 6/1992 | Lotan | F01D 25/12 |
| | | | | 415/117 |
| 2014/0346908 A1 | * | 11/2014 | Madsen | H02K 21/22 |
| | | | | 310/90 |

(Continued)

FOREIGN PATENT DOCUMENTS

| RU | 2 280 238 C1 | 7/2006 |
| RU | 2 670 771 C1 | 10/2018 |
| WO | WO 2018/197086 A1 | 11/2018 |

OTHER PUBLICATIONS

French Search Report for French Application No. 1913699, dated Sep. 11, 2020.

(Continued)

*Primary Examiner* — Eric S. McCall
(74) *Attorney, Agent, or Firm* — BIRCH, STEWART, KOLASCH & BIRCH, LLP

(57) ABSTRACT

Method for monitoring a turbomachine comprising a stator and a rotor, device, system, aircraft and computer program product. The method comprises a step of acquiring an input signal which represents a deformation of the stator or rotor of the turbomachine. The input signal has been acquired by a deformation gauge which is attached to the stator or rotor. The input signal comprises a first component which represents deformations of the stator or rotor which are caused by rotation of the rotor vanes in relation to the stator, and a second component which represents deformations which are caused by different elements of the rotor vanes. The method comprises a step of re-sampling the input signal in order to obtain a re-sampled input signal comprising a predefined whole number of samples per revolution of the turboma- (Continued)

chine rotor. The method also comprises a step of processing the re-sampled input signal, comprising: filtering the re-sampled input signal, making it possible to acquire a filtered input signal in which the second component is attenuated, and separating the filtered input signal into a plurality of third components, each third component representing a contribution to the deformation caused by a respective associated vane. The method also comprises a step of detecting, in a third component, contact between the vane associated with the third component and the stator.

14 Claims, 6 Drawing Sheets

(56) References Cited

U.S. PATENT DOCUMENTS

| | | | |
|---|---|---|---|
| 2016/0178531 A1* | 6/2016 | Nicq | G01N 21/8806 |
| | | | 356/237.2 |
| 2016/0282173 A1* | 9/2016 | Arend | G01H 1/003 |
| 2021/0123354 A1* | 4/2021 | Zecha | F01D 25/005 |
| 2021/0286007 A1* | 9/2021 | Corbetta | H02K 1/187 |

OTHER PUBLICATIONS

International Search Report for International Application No. PCT/FR2020/052285, dated Apr. 13, 2021.

* cited by examiner

METHOD FOR MONITORING A TURBOMACHINE, DEVICE, SYSTEM, AIRCRAFT AND COMPUTER PROGRAM PRODUCT

GENERAL TECHNICAL FIELD AND PRIOR ART

This disclosure relates to the general field of the monitoring of turbomachines. More particularly this disclosure relates to a monitoring method able to detect rubs between a stator and a rotor of a turbomachine. This disclosure also relates to a device and a system for implementing such a method. These rubs, between the stator and the rotor of the turbomachine, are considered as anomalies.

The turbomachines are machines which make it possible to transform the kinetic energy of a fluid into mechanical energy (and conversely) by way of a rotary assembly known as the rotor. The static part of the turbomachine is known as the stator.

These turbomachines have different designs according to their functions: turbines, pumps, compressors, turbocompressors, turbojet engines, etc. However, most of them have a common architecture composed of a rotor (a rotating part mounted on a shaft) and of a stator (fixed part connected to the structure of the aircraft) by way of a bearing. The rotor comprises a plurality of blades intended to accelerate the flow of air through the turbomachine. To set up a relative rotational movement between the rotor and the stator, the blades are of necessity spaced apart from the stator and this spacing is commonly known as the "blade tip clearance" or BTC. In an aircraft, the blade tip clearance is an important design and functional parameter of a turbomachine. The minimization of this clearance avoids excessive quantities of the air flow circumventing the row of blades in rotation and, therefore, improves the energy output of the turbomachine. However, this clearance is subject to fluctuations due to thermal expansion and mechanical phenomena dependent on the operating cycle of the turbomachine.

In some cases, these fluctuations in clearance occur asymmetrically and the clearance between certain blades of the rotor and the stator becomes zero. A zero clearance causes a friction (a rub) between the rotating part and the fixed part of the turbomachine. This can cause excessive wear of the abradable surface and a loss of efficiency caused by the increase of the leakage flow at the level of the blade tips.

For these reasons, it would be desirable to be able to detect and monitor the instants when rubs occur. The identification of the times and amplitudes of the rubs makes it possible to monitor and control these phenomena in a preventive monitoring situation. The amplitude of the proposed indicators can be used indirectly to evaluate the wear of the interfaces in contact following the rub, in a preventive maintenance situation.

OVERVIEW OF THE INVENTION

In this context, this invention solves the technical problem of the monitoring of a turbomachine, particularly by making provision for a method, a device, a system, an aircraft and a computer program product able to carry out this monitoring.

Provision is thus made, according to a first embodiment, for a method for monitoring a turbomachine comprising a stator and a rotor. The method comprises a step of acquiring an input signal representing a deformation of the stator or of the rotor of the turbomachine. The input signal has been acquired by a deformation gauge attached to the stator or to the rotor. The input signal comprises a first component representing deformations of the stator or of the rotor caused by a rotation of the blades of the rotor with respect to the stator, and a second component representing deformations caused by elements separate from the blades of the rotor. The method comprises a step of re-sampling the input signal to obtain a re-sampled input signal comprising a predefined integer number of samples per revolution of the rotor of the turbomachine. The method also comprises a step of processing the re-sampled input signal which comprises: a filtering of the re-sampled input signal to obtain a filtered input signal wherein the second component is attenuated, and the separation of the filtered input signal into a plurality of third components, each third component being representative of a contribution to the deformation caused by a respective associated blade. The method also comprises a step of detecting, in a third component, a rub between the blade associated with the third component and the stator.

This method offers the following advantages:

The use of a measurement of deformation, and the processing of the associated signal make it possible to obtain good accuracy of rub detection. This is because this method in particular makes it possible to limit the effects of aerodynamic noise and of the interference that may come from different mechanical and/or electrical sources.

The deformation gauge is moreover not very sensitive vis-à-vis the physical stresses undergone by the turbomachine. In particular, the deformation gauge has superior temperature resistance and is more resistant than other types of sensors used to determine a physical quantity related to a turbomachine. For example, a deformation gauge is in particular more resistant than a capacitive sensor.

The step of re-sampling the input signal offers the advantage of allowing the synchronization of the signal with the angle of rotation of the shaft of the turbomachine. Specifically, the concept of periodicity in mechanical signals is intrinsically related to the angle of rotation and, therefore, the analysis in the angular domain makes it possible to counterbalance speed fluctuations (which can cause a slight variation in the time duration of the periods). This step also offers the advantage of obtaining a re-sampled input signal having an integer and fixed number of samples per revolution of the turbomachine.

The filtering, performed in the step of processing the signal, offers the advantage of limiting, during detection of the rubs, the effect of deformation phenomena, other than those resulting from the rotation of the blades of the rotor with respect to the stator.

The step of detecting, in a third component, a rub between the blade associated with the third component and the stator makes it possible to detect which blade is responsible for a rub.

The monitoring method can be implemented as follows.

In an embodiment, the filtering of the step of processing the signal comprises the following steps: a step of determining values of a plurality of parameters of a model representative of the re-sampled input signal, and a step of determining a modeled input signal using the model and also the values of the plurality of parameters. In addition, the separation of the step of processing the signal separates the modeled input signal into the plurality of third components associated with the blades.

In an embodiment, the step of determining the values of the plurality of parameters determines the values of the plurality of parameters as being those minimizing a deviation between the re-sampled input signal and an input signal which is modeled using the representative model and also said values.

In an embodiment, the step of determining the values of the plurality of parameters of the model uses the following equation:

$$\hat{b} = (\Phi^T \Phi)^{-1} \Phi^T x$$

wherein:
$\hat{b}$
is a column vector of size
P
containing the values of
P
parameters of the representative model,
$\Phi$
is a matrix of size
Q*P
wherein the element in the row
q
and the column
p
has the value
$p^{q-1}$,
x
is a column vector of size
Q
containing samples of the re-sampled input signal, during a number
Q
of revolutions of the rotor.

This embodiment makes it possible to have a step of determining the values of the parameters of the model with a lower computational complexity than when using other methods.

In an embodiment, the step of determining a modeled input signal uses the following equation:

$$\hat{x} = \Phi \hat{b}$$

wherein:
$\hat{b}$
is a column vector of size
P
containing the respective values of
P
parameters of the representative model,
$\Phi$
is a matrix of size
Q*P
wherein the element in the row
q
and the column
p
has the value
$p^{q-1}$,
x
is a column vector of size
Q
containing samples of the modeled input signal, for a number
Q
of revolutions of the rotor.

This embodiment makes it possible to have a step of determining the modeled input signal with a lower computational complexity than when using other methods.

In an embodiment, the separation comprises a windowing of the modeled input signal using different time-domain windows, such as to obtain the plurality of third components.

In an embodiment, the separation uses the following equation:

$$\hat{x}_r[n] = \hat{x}[n] F(r - r/R)$$

wherein:
$\hat{x}_r[n]$
is the sample
n
of the third component associated with the blade
r,
$\hat{x}[n]$
is the sample
n
of the modeled signal, $$F(r) = \sum_{q=1}^{Q} f[n - q \cdot N]$$

with $$f[n] = \begin{cases} 1 & \text{if } -r/2R \le n \le r/2R \\ 0 & \text{elsewhere} \end{cases}$$

is a windowed signal associated with the blade
r,
Q
is a number of revolutions of the rotor during a total duration of the modeled input signal,
R
is a total number of blades of the rotor.

In an embodiment, the step of detecting, in a third component, a rub between the blade associated with the third component and the stator, comprises a step of determining an energy of the third component over at least one first revolution of the rotor. The detecting step also comprises a step of making a comparison between the determined energy and a given threshold, the rub being detected or not detected as a function of the comparison.

In an embodiment, the step of determining the energy of the third component uses the following equation:

$$I_r[q] = \sqrt{\frac{1}{N} \sum_{\overline{n}=1}^{N} \hat{x}_r[\overline{n} + (q-1) \cdot N]^2}$$

wherein:
$I_r[q]$
is the value of the energy, over the revolution
q
of the rotor, of the third component associated with the blade
r,
N
is the number of samples of the modeled input signal in the revolution
q,
$\hat{x}_r[n]$
is the sample
n
of the third component associated with the blade
r.

In an embodiment, the given threshold is computed as a function of the following equations:

$$\mu_r^{(ref)} = \frac{1}{Q_{ref}} \sum_{q=1}^{Q_{ref}} I_r[q]$$

$$\sigma_r^{(ref)} = \sqrt{\frac{1}{Q_{ref}} \sum_{q=1}^{Q_{ref}} I_r[q]^2}$$

$$\lambda_r = \mu_r^{(ref)} + 3\sigma_r^{(ref)}$$

wherein:

$\lambda_r$ is the given threshold associated with the blade r, $Q_{ref}$ is a given number of rotor revolutions, $I_r[q]$ is the value of the energy, over the revolution, q of the third component associated with the blade r.

This embodiment makes it possible to easily set the threshold that allows a rub to be detected. Specifically, it is based on the energy of the samples of the third components obtained by the monitoring device during reference cycles. The detection threshold can therefore be determined using the method implemented in the monitoring device, without the need for a specific method to determine the detection threshold. In addition this embodiment makes it possible to determine the detecting threshold based directly on the turbomachine.

Provision is also made, according to an embodiment, for a device for monitoring a turbomachine comprising a stator and a rotor. The device comprises an input for receiving an input signal representing a deformation of the stator or of the rotor. The input signal has been acquired by a deformation gauge attached to the stator or to the rotor. The input signal comprises a first component representing deformations of the stator or of the rotor caused by a rotation of the blades of the rotor with respect to the stator, and a second component representing deformations of the stator or of the rotor caused by elements separate from the blades of the rotor. The device comprises a data— processing unit configured to perform the following steps: a step of acquiring the input signal acquired by the deformation gauge attached to the stator or to the rotor, and a step of re-sampling the input signal to obtain a re-sampled input signal comprising a predefined integer number of samples per revolution of the rotor of the turbomachine and a step of processing the re-sampled input signal which comprises the filtering of the re-sampled input signal to obtain a filtered input signal wherein the second component is attenuated and the separation of the filtered input signal into a plurality of third components, each third component being representative of a contribution to the deformation caused by a respective associated blade. The method also comprises a step of detecting, in a third component, a rub between the blade associated with the third component and the stator.

This device offers the following advantages:

The use of a deformation measurement, and the processing of the associated signal make it possible to obtain good accuracy of rub detection. This is because this method in particular makes it possible to limit the effects of aerodynamic noise and of the interference which may come from different mechanical and/or electrical sources.

The deformation gauge is moreover not very sensitive vis-à-vis the physical stresses undergone by the turbomachine. In particular, the deformation gauge has a superior temperature resistance and is more resistant than other types of sensors used to determine a physical quantity related to a turbomachine. For example, a deformation gauge is in particular more resistant than a capacitive sensor.

Provision is also made, according to an embodiment, for a monitoring system comprising the monitoring device previously described, and a deformation gauge suitable for delivering an input signal representing a deformation of the stator or of the rotor of the turbomachine. As part of this system, the deformation gauge is connected to the input of the monitoring device.

Provision is also made, according to an embodiment, for an aircraft, which comprises a turbomachine. The turbomachine comprises a stator and a rotor suitable for being rotationally driven with respect to the stator, and a monitoring system as set out previously, wherein the deformation gauge is attached to the stator or to the rotor.

Provision is also made, according to an embodiment, for a computer program product comprising program code instructions for executing the steps of the method for monitoring a turbomachine, as shown previously, when this program product is executed by at least one data-processing unit.

BRIEF DESCRIPTION OF THE DRAWINGS

Other features and advantages of the invention will become further apparent from the following description, which is purely illustrative and non-limiting, and must be read with reference to the appended figures.

DESCRIPTION OF ONE OR MORE EMBODIMENTS

Figure 1:
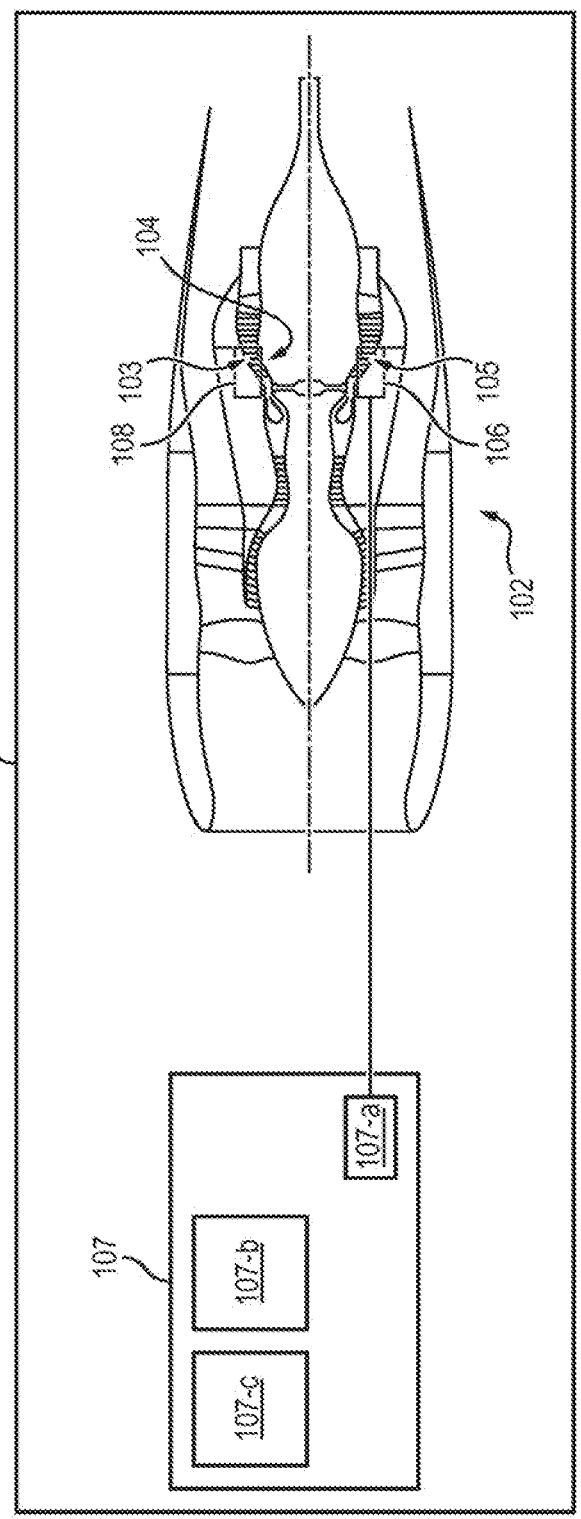
FIG. 1 shows an aircraft including a turbomachine and a device for monitoring the turbomachine.

FIG. 1 schematically represents an aircraft 101. The aircraft 101 comprises a turbomachine 102.

In the example illustrated in FIG. 1, the turbomachine 102 comprises a nacelle, a fan, a low-pressure spool, a high-pressure spool and a combustion chamber. The low-pressure spool comprises a low-pressure compressor, a low-pressure turbine and a low-pressure shaft connecting the low-pressure compressor to the low-pressure turbine. The high-pressure spool comprises a high-pressure compressor, a high-pressure turbine and a high-pressure shaft connecting the high-pressure compressor to the high-pressure turbine.

When the turbomachine is in operation, the high-pressure turbine rotationally drives the high-pressure compressor via the high-pressure shaft. The low-pressure turbine rotationally drives the low-pressure compressor and the fan via the low-pressure shaft. The fan generates a primary air flow and a secondary air flow (or bypass flow). The primary air flow passes successively through the low-pressure compressor, the high-pressure compressor, the combustion chamber, the high-pressure turbine and the low-pressure turbine.

The high-pressure turbine comprises a stator 103 and a rotor 104 suitable for being rotationally driven with respect to the stator 103. The stator 103 is mounted fixed on a structure of the aircraft, for example on the casing of the high-pressure turbine. The rotor 104 comprises a plurality of blades 105. The turbojet engine 102 also comprises a deformation gauge 106. In FIG. 1, the gauge is attached to the stator of the high-pressure turbine, but it is also possible to attach it to the rotor of the high-pressure turbine.

The aircraft also comprises a monitoring device 107 able to detect a rub between the stator 103 and the rotor 104. This device 107 comprises an input 107-*a* for receiving, from the deformation gauge 106, an input signal representative of a deformation of the stator 103. This input 107-*a* includes an acquisition line providing, among other things, the digitization of the input signal. The sampling frequency of the input signal is configurable. This frequency, which depends on the turbomachine, is advantageously in the order of several tens of kHz. This device also comprises a data-processing unit 107-*b*. This data-processing unit 107-*b* is configured to execute the steps of a monitoring method able to detect a rub between the stator 103 and the rotor 104 of the turbomachine 102. Typically, the data-processing unit 107-*b* comprises at least one processor for implementing a computer program. This computer program comprises program code instructions configured to implement the method for monitoring the turbomachine 102, when these instructions are executed by the processor of the data-processing unit 107-*b*. Moreover, the device also comprises a memory 107-*c* for memorizing data, particularly an input signal received from the deformation gauge 106.

In an embodiment, a sensor 108, giving an item of information representing times of passing of the blades, is placed on the turbomachine 102. This sensor 108 is generally placed on the stator. This sensor 108, which is used to indicate the times of passing of the blades, is also known as a blade tip sensor. This sensor 108 can for example be an optical probe optically measuring the passing of the blades.

The monitoring device 107 makes it possible to obtain at the output:
the indications of the rubs of the blades,
the detection threshold associated with these rubs and
the times of these rubs.

It is possible to display these items of information on a screen or to store them in the memory 107-*c* in order to, where applicable, transmit them to another device, for example a fixed monitoring station.

Figure 2:
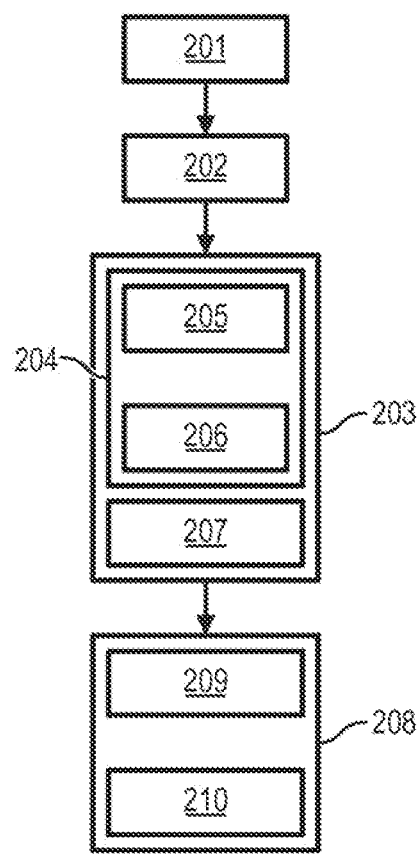
FIG. 2 shows the steps 201 and 202 of the method for monitoring a turbomachine.

With reference to FIG. 2, the monitoring device 107 able to detect a rub, between the stator 103 and the rotor 104 of the turbomachine 102, shown in FIG. 1, operates as follows.

In a first step 201, the input 107-*a* of the device 107 acquires an input signal. This input signal is representative of a deformation of the stator 103 or of the rotor 104 of the turbomachine 102. The input signal has been generated by the deformation gauge 106 attached to the stator 103 or to the rotor 104. The input signal comprises a first component representative of deformations of the stator 103 or of the rotor 104 caused by the rotation of the blades 105 of the rotor 104 with respect to the stator 103, and a second component representative of deformations caused by elements separate from the blades 105 of the rotor 104.

In an embodiment, the signal acquired by the deformation gauge 106 is a signal sampled at a sampling frequency $F_s$ (this latter is for example in the order of 100 kHz).

The processing unit 107-*b* then performs a step 202 of re-sampling the input signal, to obtain a re-sampled input signal comprising a predefined integer number of samples per revolution of the rotor of the turbomachine. This re-sampling can be described as angular sampling.

The re-sampling of the signal received from the deformation gauge 106 uses the position signal of the blades generated by the sensor 108. The sensor 108 generates a position signal representing the times of passing of the blades 105 in front of the sensor 108. It is also possible to use an indication of the number of blades 105 of the rotor 104. The signal obtained after re-sampling is an "angular" signal (i.e. sampled at fixed angular intervals). This re-sampled signal is obtained by an interpolation of the signal received from the deformation gauge 106. The re-sampled signal is composed of samples spaced apart by an angle $\Delta\theta$, which is the angular sampling period. In addition, with each revolution of the rotor are associated exactly $N$ samples of the re-sampled signal.

The device then performs a step 203 of processing the re-sampled input signal to detect the rub.

The step 203 of processing the signal comprises a filtering 204 of the re-sampled input signal. This filtering makes it possible to obtain a filtered signal wherein the second component is attenuated.

This second component can be considered as noise. Thus the input signal has the following form:

$$\forall n \in \{1, \ldots, L\} x[n]=d[n]+w[n]$$

where
$L$
represents the total number of samples,
$n$
represents a given sample,
$x[n]$
represents the sample
$n$
of the input signal,
$d[n]$
represents the first component of the sample
$n$
of the input signal,
$w[n]$
represents the second component of the sample
$n$
of the input signal.

One way of performing this filtering 204 is for example to perform a step 205 of determining values of a plurality of parameters of a model representative of the re-sampled input signal, then a step 206 of determining an input signal modeled using the model and also the values of the plurality of parameters. This way of performing this filtering 204 is purely illustrative and non-limiting, and it is possible to perform this filtering 204 in other ways. The step 203 of processing the signal can also comprise the separation 207 of the re-sampled input signal into a plurality of third components. Each third component is representative of a contribution to the deformation caused by a respective associated blade. This separation 207 is performed after the filtering 204 of the signal. If the filtering is performed via the steps 205 and 206, the separation 207 is performed on the modeled input signal.

Next, the data-processing unit 107-b performs a step 208 of detecting, in the third components, a rub between the blade 105, associated with the third component, and the stator 103.

One way of performing this detection 208 is for example to perform a step 209 of determining an energy of the third component over at least one first revolution of the rotor then a step 210 of making a comparison between the determined energy and a given threshold. The rub is detected or not detected as a function of the comparison. This way of performing this detection 208 is purely illustrative and non-limiting, and it is possible to perform this detection 208 in other ways.

In this disclosure, two notations will be used to reference a sample:

n and $\bar{n}$.

n is used to reference a sample in the absolute sense, it is the n ith sample, taking as the initial time the start of the re-sampled input signal.

$\bar{n}$ is used to reference a sample in the relative sense, in relation to one of the revolutions. Thus, $\bar{n}$ denotes the $\bar{n}$ ith sample, taking as the initial time the start of the rotor revolution during which the sample was recorded.

Using this notation, there is only a single sample n but there is a plurality of samples $\bar{n}$.

Each of the samples $\bar{n}$ being respectively associated with one of the

Q revolutions of the rotor of the turbomachine.

The change from n to $\bar{n}$ is made using the equation $\bar{n} = \lfloor (n-1)/N \rfloor + 1$ where N represents the number of samples per revolution and where $\lfloor a/b \rfloor$ denotes the remainder of the division of a by b.

In an equivalent manner the absolute position n of the sample $\bar{n}$ of the revolution q is given by the equation $n = N*(q-1) + n$.

The data-processing unit 107-b can perform the determining step 205 in different ways. By way of illustrative and non-limiting example, it is possible to perform this step by considering that the parameter values are those which minimize a deviation between the input signal generated by the deformation gauge 106 and a modeled input signal using the representative model and also said values.

The input signal generated by the deformation gauge 106 can be modeled thus:

$$\forall q \in \{1, \ldots, Q\} \forall \bar{n} \in \{1, \ldots, N\} \quad s_q[\bar{n}] = \sum_{p=0}^{P} b_p[\bar{n}] q^p$$

Where:

q represents one of the revolutions of the turbomachine 102,

Q represents the number of revolutions over which the input signal, $\bar{n}$ represents one of the samples, of one of the revolutions,

N represents the number of samples over each revolution, $s_q[\bar{n}]$ represents the $\bar{n}$ ith sample of the modeled signal associated with the revolution q of the turbojet engine,

P is the number of parameters, $b_p[\bar{n}]$ represents the parameter p of the representative model associated with the sample $\bar{n}$.

The value

P of the order of the polynomial and therefore of the number of parameters must be high enough to take into account the variations in amplitude of the input signal. Advantageously, P will have a value between 5 and 20.

Using this model of the input signal, the values of the parameters will be obtained via the equation:

$$\forall \bar{n} \in \{1, \ldots, N\} \hat{b}[\bar{n}] = \arg\min \left( \sum_{q=1}^{Q} \left( \sum_{p=0}^{P} b_p[\bar{n}] q^p - x_q[\bar{n}] \right)^2 \right)$$

where $x_q[\bar{n}]$ is the sample of the input signal generated by the deformation gauge 106 at the time $\bar{n}$ of the revolution q, b[n]

is a column vector of size

P containing the values of

P parameters of the representative model associated with the sample
$\overline{n}$.

By way of non-limiting and purely illustrative example, it is possible to determine the values of this plurality of parameters of the model using the following equation:

$$\hat{b}[\overline{n}] = (\Phi^T \Phi)^{-1} \Phi^T x[\overline{n}]$$

wherein:
$\hat{b}[\overline{n}]$
is a column vector of size
P
containing the values of
P
parameters of the representative model associated with the sample
$\overline{n}$,
$\Phi$
is a matrix of size
Q*P
wherein the element in the row
q
and the column
p
has the value
$p^{q-1}$,
$x[\overline{n}]$
is a column vector of size
Q
containing samples of the input signal generated by the deformation gauge and where applicable re-sampled, during a number
Q
of revolutions of the rotor, the samples all having the same relative position
$\overline{n}$
in the revolution of the rotor and each sample being respectively associated with one of the
Q
revolutions of the rotor.

Following the determination of this plurality of parameters, the monitoring device 107 determines a modeled input signal. This step 206 of determining a modeled input signal can be done in different ways. By way of illustration and without limitation, the modeled input signal
$\hat{x}[\overline{n}]$
with the form $$\hat{x}[\overline{n}] = \Phi \hat{b}[\overline{n}],$$

wherein:
$\hat{b}[\overline{n}]$
is the column vector of size
P
containing the values of
P
parameters of the representative model associated with the sample
$\overline{n}$,
$\Phi$
is a matrix of size
Q*P
wherein the element in the row
q
and the column
p
has the value
$p^{q-1}$,
$\hat{x}[\overline{n}]$
is a column vector of size
Q
containing samples of the modeled input signal for a number
Q
of revolutions of the rotor, the samples all having the same relative position
$\overline{n}$
in the revolution of the rotor and each sample being respectively associated with one of the
Q
revolutions of the rotor.

In this embodiment, the modeled input signal
$\hat{x}[\overline{n}]$
is the input signal generated by the deformation gauge 106, where applicable re-sampled and filtered, wherein the second components have been attenuated.

The processing unit 107-b is configured to separate the contribution of the different blades 105. This separating step 207 is performed on the basis of the re-sampled input signal which was filtered to attenuate the second components. In the embodiment wherein the filtering step 204 is based on the steps 205 and 206, the signal on which the separation is based is the modeled input signal
$\hat{x}[\overline{n}]$ This separation 207 may be made by a windowing of the modeled input signal using different time-domain windows. This windowing makes it possible to obtain the plurality of third components.

This separation can be done in different ways. By way of illustrative and non-limiting example, the samples of the third components
$\hat{x}_r[n]$
will be obtained by multiplying the samples of the modeled input signal
$\hat{x}[n]$
by the samples of a signal
F(n)
including a time window. Different types of window may be used, such as for example a Gaussian window, a Hanning window, or a rectangular window. In the case of a rectangular window, this gives:

$$\hat{x}_r[n] = \hat{x}[n] F(r-r/R)$$

wherein:
$\hat{x}_r[n]$
is the sample
n
of the third component associated with the blade
r,
$\hat{x}[n]$
is the sample
n
of the modeled signal, $$F(r) = \sum_{q=1}^{Q} f[n - q \cdot N]$$

with $$f[n] = \begin{cases} 1 & \text{if } -r/2R \leq n \leq r/2R \\ 0 & \text{elsewhere} \end{cases}$$

is a windowed signal associated with the blade
r,
Q
is a number of revolutions of the rotor completed during a total duration of the modeled input signal,
R
is a total number of blades of the rotor.

In order to calibrate the start of the time windows, it is possible to use the position signal coming from the sensor 108, giving an item of information representative off the times of passing of the blades. Using this sensor 108, it is possible to know the position of each blade and to apply the windowed signal in such a way as to promote the times associated with the blades of interest.

$\hat{x}[n]$
is obtained from the vector
$\hat{x}[\overline{n}]$
as follows. In a first step the revolution of the rotor
q
associated with the absolute sample
n
is determined. Knowing the number of samples
N
in one revolution of the rotor, this revolution of the rotor
q
is $$q = \mathrm{floor}(n/N) + 1,$$

or
floor(x)
is the greatest integer less than
x.
In a second step the relative position of the sample
$\overline{n}$
is determined using the formula $$\overline{n} = \lfloor (n-1)/N \rfloor + 1.$$

Thus knowing the relative position
$\overline{n}$,
it is possible to select the correct vector
$\hat{x}[\overline{n}]$
associated with the absolute sample
n
and then within the vector
$\hat{x}[\overline{n}]$
the value
$\hat{x}[n]$
is obtained by the selection of the sample
q
of the vector
$\hat{x}[\overline{n}]$.

In an embodiment, the step 501-*a* of determining an energy of the third component is performed by summing the squares of the samples of the third component over one revolution of the rotor. This summation is done independently for each blade. This energy is thus obtained as:

$$I_r[q] = \sqrt{\frac{1}{N}\sum_{\overline{n}=1}^{N} \hat{x}_r[\overline{n} + (q-1)\cdot N]^2}$$

wherein:
$I_r[q]$
is the value of the energy, over the revolution
q
of the rotor, of the third component associated with the blade
r,
N
is the number of samples of the input signal, where applicable re-sampled, associated with the revolution
q,
$\hat{x}_r[n]$
is the sample
n
of the third component associated with the blade
r.

To compute the detection threshold, the energy of the third component over a plurality of reference revolutions is used. This detection threshold is based on the mean of the energy of the third component over a plurality of reference revolutions $$\left( \mu_r^{(ref)} = \frac{1}{Q_{ref}} \sum_{q=1}^{Q_{ref}} I_r[q] \right)$$

and on the standard deviation of this energy $$\left( \sigma_r^{(ref)} = \sqrt{\frac{1}{Q_{ref}} \sum_{q=1}^{Q_{ref}} I_r[q]^2} \right)$$

This threshold then has the following form:

$$\lambda_r = \mu_r^{(ref)} + 3\sigma_r^{(ref)}.$$

In these different equations:
$\lambda_r$
is the given threshold associated with the blade
r,
$Q_{ref}$
is a given number of rotor revolutions,
$I_r[q]$
is the value of the energy, over the revolution
q,
of the third component associated with the blade
r.

It is possible to define an interval of confidence associated with this detection threshold, which can be determined as follows:

Determining an empirical probability density of the indicators by making the assumption that there are no rubs and using reference signals in which there are no rubs.

On the basis of this empirical probability density, determining the intervals of confidence.

Thus this embodiment makes it possible to compute a threshold as a function of the mean and the standard deviation of the indicator over a number
$Q_{ref}$
of cycles taken as reference cycles. These reference cycles are cycles during which there are no rubs between a blade of the rotor and the stator.

In an embodiment the monitoring device 107 or the monitoring method are configured to allow the user to specify:
 the parameters of the turbomachine (for example the number of blades) and
 the parameters used to detect the rubs (for example the order of the polynomial modeling the input signal and therefore the number of parameters of this model of the input signal, the type of the separation window, or the interval of confidence associated with the detection threshold).

Figure 3:
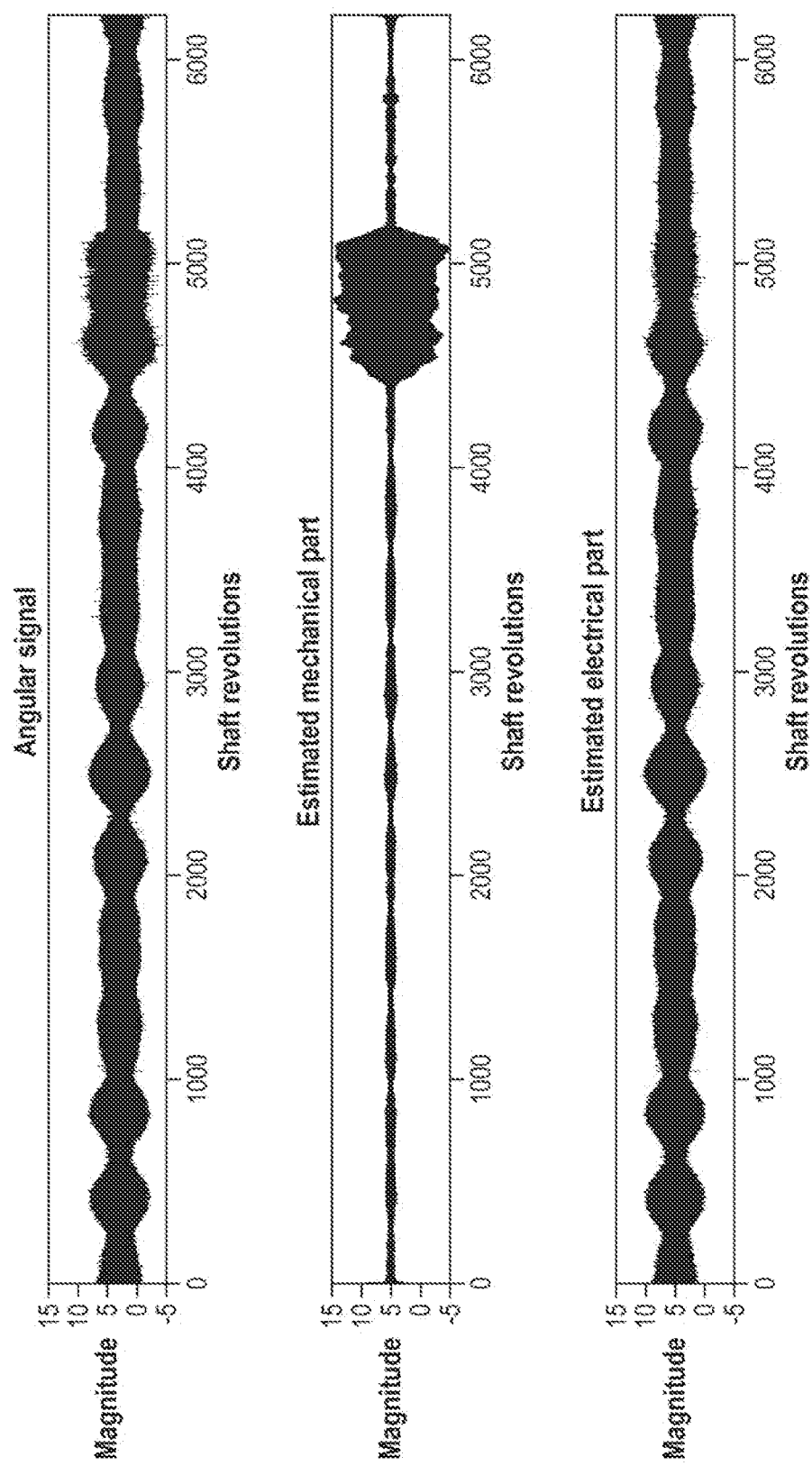
FIG. 3 shows the result of the step of filtering the signal received from the deformation gauge.
Figure 4:
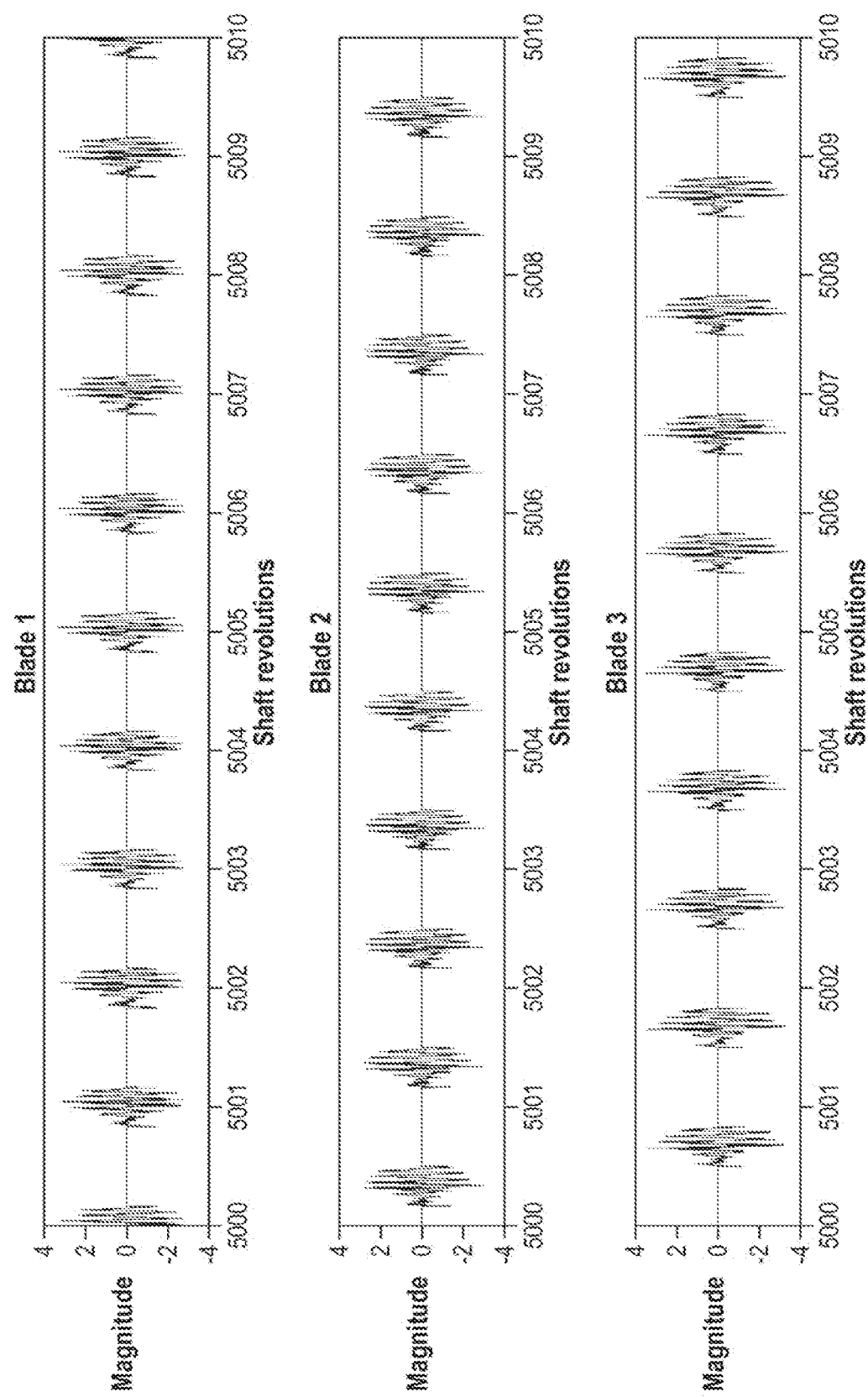
FIG. 4 shows the result of the step of separating the filtered signal.
Figure 5:
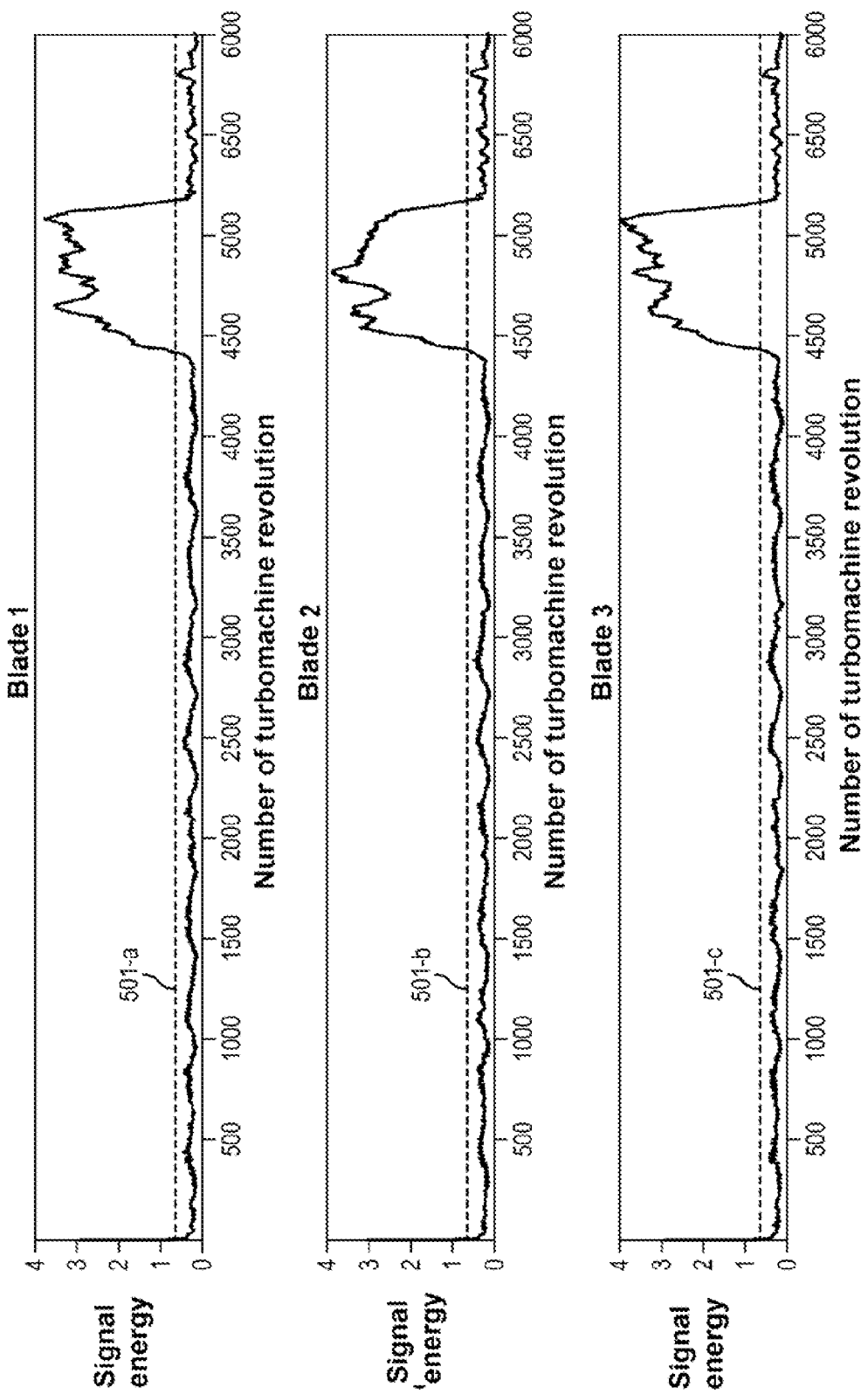
FIG. 5 shows the result of the step of detecting the rubs using the separated signal.

FIGS. 3 to 5 show the effect of the different steps of the monitoring method able to detect a rub, on a signal coming from the deformation gauge 106. The signal used in these figures is a real signal measured on a turbomachine including three blades.

FIG. 3 shows, on the top curve, the amplitude of the signal received from the deformation gauge 106. This signal includes a first component, representative of deformations of the stator 103 or of the rotor 104 caused by the rotation of the blades 105 of the rotor 104 with respect to the stator 103, and a second component representative of deformations caused by elements separate from the blades of the rotor. The middle curve shows the signal filtered by the filtering step 204. In this filtered signal the second component has been greatly attenuated. Thus the middle curve mainly shows the first component of the signal received from the deformation gauge. This filtered signal corresponds to the contribution of all the blades on the first component. By using this filtered signal it is possible to easily detect the times of contact of the blades (on the basis of the revolution 4500 and all the way to the revolution 5200). By way of comparison these same times are not detectable in the signal of the top curve, since the first component is hidden by the noise generated by the second component. Finally, the bottom curve of FIG. 3 shows the second component of the signal received from the deformation gauge 106.

FIG. 4 shows the effect of the separation of the filtered signal into a plurality of third components, each third component being representative of a contribution to the deformation caused by one of the three blades. The filtered signal is that obtained on the middle curve of FIG. 3. The signals of FIG. 4 shows these three components for revolutions going from revolution 5000 to 5010.

FIG. 5 shows the energy of the third components associated with the three blades of the turbomachine. These three curves are respectively shown with three detecting thresholds 501-a to 501-c. Thus between the revolutions 4400 to 5200, the energies of the third components are greater than the detection thresholds which corresponds to the detection of rubs.

In the re-sampling step 202, the signal received from the deformation gauge 106 is transformed into an angular signal x(θ) on the basis of the blade tip sensor 108 measuring the passing of the blades of the turbomachine. Θ denotes the angle of rotation of the shaft of a turbomachine with P blades (full rotation of the shaft of the turbomachine).

The first blade will be centered on the angle θ=0+kΘ (k is an integer), the second blade will be centered on the angle at θ=Θ/P+kΘ, the third blade will be centered on the angle at θ=2*Θ/P+kΘ and the $i^{th}$ blade will be centered on the angle at θ=i*Θ/P+kΘ.

The multiplication of the filtered input signal (by the polynomial synchronous average) by a cyclic window (which repeats with each full rotation), makes it possible to obtain the contribution of the blade i if the center of this window is aligned with the angular position of the blade. The generic equation of this window is:

$$F(\theta) = \sum_{q=1}^{Q} f[\theta - q \cdot \Theta]$$

For the first blade, the equation of the window used is as follows:

$$F_0(\theta) = F(\theta) = \sum_{q=1}^{Q} f[\theta - q \cdot \Theta]$$

For the second blade, the window used for the first blade is offset by the angle separating two blades (this angle is equal to the angle of rotation of the turbomachine divided by the number of blades Θ/P), the equation of the window used is as follows:

$$F_1(\theta) = F(\theta - \Theta/P) = \sum_{q=1}^{Q} f[\theta - q \cdot \Theta - \Theta/P]$$

For the third blade, the window used for the first blade is offset by twice the angle separating two blades, the equation of the window used is as follows:

$$F_2(\theta) = F(\theta - 2*\Theta/P) = \sum_{q=1}^{Q} f[\theta - q \cdot \Theta - 2 \cdot \Theta/P]$$

For the $i^{th}$ blade, the window used for the first blade is offset by i times the angle separating two blades, the equation of the window used is as follows:

$$F_i(\theta) = F(\theta - i*\Theta/P) = \sum_{q=1}^{Q} f[\theta - q \cdot \Theta - i \cdot \Theta/P]$$

Figure 6:
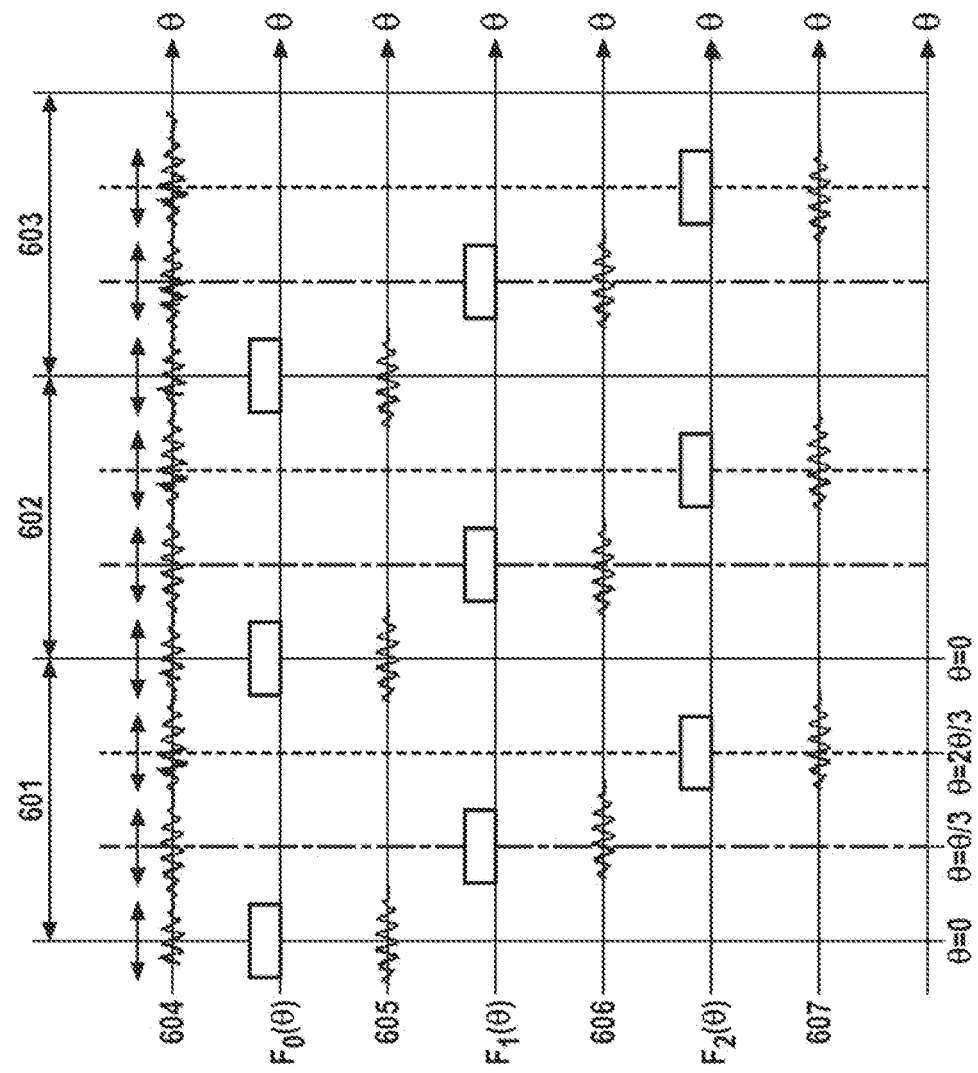
FIG. 6 illustrates the step of separating the filtered input signal.

FIG. 6 illustrates this step 207 of separation for a turbomachine comprising three blades. In this figure, the time is shown as passing from left to right, with at 601 the first revolution of the turbomachine, at 602 the second revolution and at 603 the third revolution. At 604, the contribution of all the blades is shown. At 605, the contribution of the first blade is shown. This contribution is shown by multiplying the contribution of all the blades by the window $F_0(\Theta)$. At 606, the contribution of the second blade is shown. This contribution is shown by multiplying the contribution of all the blades by the window $F_1(\Theta)$. At 607, the contribution of the third blade is shown. This contribution is shown by multiplying the contribution of all the blades by the window $F_2(\Theta)$.

The invention claimed is:

1. A method of monitoring a turbomachine comprising a stator and a rotor and a deformation gauge attached to the stator or to the rotor, the method comprising:
   a step of acquiring an input signal by the deformation gauge, wherein the input signal comprises a first component representative of deformations of the stator or of the rotor caused by the rotation of the blades of the rotor with respect to the stator, and a second component representative of deformations of the stator or of the rotor caused by elements separate from the blades of the rotor;
   a step of re-sampling the input signal to obtain a re-sampled input signal comprising a predefined integer number of samples per revolution of the rotor of the turbomachine;

a step of processing the re-sampled input signal, which comprises a filtering the re-sampled input signal to obtain a filtered input signal wherein the second component is attenuated and separating the filtered input signal into a plurality of third components, each third component being representative of a contribution to the deformation caused by a respective associated blade; and a step of detecting, in a third component, a rub between the blade associated with the third component and the stator.

2. The method as claimed in claim 1, wherein filtering the re-sampled input signal comprises determining values of a plurality of parameters of a model representative of the re-sampled input signal and determining a modeled input signal using the model representative of the re-sampled input signal and the determined values of the plurality of parameters.

3. The method as claimed in claim 2, wherein the determined values of the plurality of parameters are those minimizing a deviation between the re-sampled input signal and an input signal modeled using the model representative of the re-sampled input signal and said determined values.

4. The method as claimed in claim 2, wherein determining the values of the plurality of parameters of the model representative of the re-sampled input signal uses the following equation:

$$\hat{b}=(\Phi^T\Phi)^{-1}\Phi^T x$$

wherein:
$\hat{b}$ is a column vector of size P containing the values of the parameters of the model representative of the re-sampled input signal,
$\Phi$ is a matrix of size Q*P wherein an element in a row q and a column p has a value $p^{q-1}$,
x is a column vector of size Q containing samples of the re-sampled input signal, during a number Q of revolutions of the rotor.

5. The method as claimed in claim 2, wherein determining a modeled input signal uses the following equation:

$$\hat{x}=\Phi\hat{b}$$

wherein:
$\hat{b}$ is a column vector of size P containing the values of the parameters of the model representative of the re-sampled input signal,
$\Phi$ is a matrix of size Q*P wherein an element in a row q and a column p has a value $p^{q-1}$,
x is a column vector of size Q containing samples of the re-sampled input signal, during a number Q of revolutions of the rotor.

6. The method as claimed in claim 2, wherein separating the filtered input signal comprises a windowing of the modeled input signal using different time-domain windows.

7. The method as claimed in claim 6, wherein separating the filtered input signal uses the following equation:

$$\hat{x}_r[n]=\hat{x}[n]F(r-r/R)$$

wherein:
$\hat{x}_r[n]$ is a sample n of the third component associated with the blade r,
$\hat{x}[n]$ is a sample n of the modeled input signal,
$F(r)=\sum_{q=1}^{Q} f[n-q\cdot N]$ with $$f\cdot[n] = \begin{cases} 1 & \text{if } -r/2R \le n \le r/2R \\ 0 & \text{elsewhere} \end{cases}$$

is a windowed signal associated with the blade r,
Q is a number of revolutions of the rotor during a total duration of the modeled input signal,
R is a total number of blades of the rotor.

8. The method as claimed in claim 1, wherein detecting, in a third component, a rub between the blade associated with the third component and the stator, comprises determining an energy of the third component over at least one first revolution of the rotor and comparing the determined energy with a given threshold.

9. The method as claimed in claim 8, wherein determining the energy of the third component uses the following equation:

$$I_r[q] = \sqrt{\frac{1}{N}\sum_{\bar{n}=1}^{N}\hat{x}_r[\bar{n}+(q-1)\cdot N]^2}$$

wherein:
$I_r[q]$ is a value of the energy, over a revolution q of the rotor, of the third component associated with the blade r,
N is a number of samples of the re-sampled input signal in the revolution q,
$\hat{x}_r[n]$ is a sample n of the third component associated with the blade r.

10. The method as claimed in claim 8, further comprising calculating the given threshold with the following equations:

$$\mu_r^{(ref)} = \frac{1}{Q_{ref}}\sum_{q=1}^{Q_{ref}} I_r[q]$$

$$\sigma_r^{(ref)} = \sqrt{\frac{1}{Q_{ref}}\sum_{q=1}^{Q_{ref}} I_r[q]^2}$$

$$\lambda_r = \mu_r^{(ref)} + 3\sigma_r^{(ref)}$$

wherein:
$\lambda_r$ is the given threshold,
$Q_{ref}$ is a given number of rotor revolutions,
$I_r[q]$ is a value of the energy, over the revolution q, of the third component associated with the blade r.

11. A non-transitory computer-readable medium having stored thereon program code instructions which, when executed by a processor, cause the processor to implement the method of claim 1.

12. A device for monitoring a turbomachine comprising a stator and a rotor and a deformation gauge attached to the stator or to the rotor, the device comprising:
an input for obtaining an input signal acquired by a deformation gauge, the input signal comprising a first component representative of deformations of the stator or of the rotor caused by the rotation of the blades of the rotor with respect to the stator, and a second component representative of deformations of the stator or of the rotor caused by elements separate from the blades of the rotor; and
a data-processing unit configured to perform the following steps:
a step of acquiring the input signal; and
a step of re-sampling the input signal to obtain a re-sampled input signal comprising a predefined integer number of samples per revolution of the rotor of the turbomachine, and
a step of processing the re-sampled input signal which comprises filtering of the re-sampled input signal to obtain a filtered input signal wherein the second component is attenuated and separating the filtered input signal into a plurality of third components, each third component being representative of a contribution to the deformation caused by a respective associated blade; and a step of detecting, in a third component, a rub between the blade associated with the third component and the stator.

13. A monitoring system comprising:

the device as claimed in claim 12, a deformation gauge suitable for delivering an input signal representative of a deformation of the stator or of the rotor of the turbomachine;

wherein the deformation gauge is connected to the input of said device.

14. An aircraft, comprising:

a turbomachine comprising a stator and a rotor suitable for being rotationally driven with respect to the stator, and a monitoring system as claimed in claim 13, wherein the deformation gauge is attached to the stator or to the rotor.

* * * * *